United States Patent [19]

Catallo

[11] E Re. 31,115

[45] Reissued Jan. 4, 1983

[54] METHOD OF PADDING AND EXTRACTING A CONTINUOUSLY ADVANCING CIRCULAR KNIT FABRIC TUBE

[76] Inventor: Frank Catallo, c/o Fab-Con, 103 Harbor Rd., Port Washington, N.Y. 11050

[21] Appl. No.: 179,272

[22] Filed: Aug. 18, 1980

Related U.S. Patent Documents

Reissue of:

[64] Patent No.: 4,112,532
Issued: Sep. 12, 1978
Appl. No.: 801,550
Filed: May 31, 1977

U.S. Applications:

[62] Division of Ser. No. 739,258, Nov. 5, 1976, abandoned.

[51] Int. Cl.[3] ..... D06B 3/10; D06B 15/02

[52] U.S. Cl. ..... 8/151; 26/51.3; 26/81; 26/84; 68/5 D; 68/13 R; 68/22 B; 118/405

[58] Field of Search ..... 68/13 R, 22 R, 22 B, 68/5 D, 5 E, 43, 99, 175; 8/149.1, 151; 26/80, 81, 84, 51.3; 118/404, 405, 414

[56] References Cited

U.S. PATENT DOCUMENTS

| | | | |
|---|---|---|---|
| 3,076,724 | 2/1963 | Freeze et al. . | |
| 3,207,616 | 9/1965 | Cohn et al. | 68/43 X |
| 3,479,706 | 11/1969 | Catallo | 26/51.3 X |
| 3,973,306 | 8/1976 | Catallo | 26/51.3 X |

FOREIGN PATENT DOCUMENTS

| | | | |
|---|---|---|---|
| 736355 | 5/1943 | Fed. Rep. of Germany . | |
| 1114158 | 9/1961 | Fed. Rep. of Germany . | |
| 1148963 | 5/1963 | Fed. Rep. of Germany . | |
| 1410845 | 5/1972 | Fed. Rep. of Germany . | |
| 636010 | 4/1950 | United Kingdom | 68/22 B |
| 907470 | 10/1962 | United Kingdom . | |
| 977400 | 12/1964 | United Kingdom . | |
| 1036835 | 7/1966 | United Kingdom . | |

*Primary Examiner*—Philip R. Coe
*Attorney, Agent, or Firm*—Pennie & Edmonds

[57] ABSTRACT

The disclosure is that of an invention directed to a horizontal padder and extractor for circular knit fabric tubes and includes a pair of squeeze rolls disposed with their axes in the same horizontal plane, thus defining an upwardly open nip for retaining a puddle of impregnating liquid. A safety guard is pivotally mounted over the squeeze rolls and is operably connected to an electrical interlock to deactivate the machine whenever the safety guard is not in proper position. A steaming station is provided ahead of the padder and extractor and a horizontal orienting spreader feeds the spread fabric tube to the padder at a tangent to the upper surface of the front squeeze roll thereof.

2 Claims, 9 Drawing Figures

METHOD OF PADDING AND EXTRACTING A CONTINUOUSLY ADVANCING CIRCULAR KNIT FABRIC TUBE

Matter enclosed in heavy brackets [ ] appears in the original patent but forms no part of this reissue specification; matter printed in italics indicates the additions made by reissue.

RELATED APPLICATION

This application is a division of application Ser. No. 739258, filed Nov. 5, 1976, *now abandoned.*

THE INVENTION

This invention relates generally to new and useful improvements in padders and extractors for circular knitfabric tubes and particularly seeks to provide a novel-combined assembly in which a flattened circular knit fabric tube is first oriented geometrically and steamed by advance over an orienting spreader fitted with steam hoods and then directly introduced into a horizontal padder for chemical impregnation and extraction before being subjected to any heat treatment such as thermosetting or drying and curing, with or without calendering.

Heretofore, one of the problems in padding and extracting spread flattened cicular knit fabric tubes has been due to the tendency of the tubes to vary in width between the discharge end of an associated spreader and the nip of the squeeze rolls of the extractor, which rolls set the width of the tubes. That problem is solved through the use of a horizontal padder constructed in accordance with this invention and which includes only two horizontal squeeze rolls that contain a puddle of impregnating liquid in the upper facing nip therebetween and in which the fabric tube is received directly from the spreader tangential to the upper surface of the front squeeze roll so that it need only traverse a few degrees of arc before becoming immersed in the impregnating liquid and only 90° of arc before extracting engagement in the nip of the squeeze rolls.

Also, since the squeeze rolls of the padder tend to set the face layers of the fabric tube in the same geometric orientation that they had when leaving the spreader, it is important that the spreader be capable of properly orienting the face layers as well as establishing a predetermined spread width. A spreader that is particularly suitable for this purpose is disclosed and claimed in U.S. Pat. No. 3973304, granted Aug. 10, 1976; and a method of properly orienting the face layers of an advancing flattened circular knit fabric tube is disclosed and claimed in U.S. Pat. No. 3973306, granted Aug. 10, 1976.

Therefore, an object of this invention is to provide an assembly by which an advancing flattened circular knit fabric tube may be immediately directly impregnated and extracted after having been properly spread to a predetermined width and after having its face layers properly geometrically oriented.

Another object of this invention is to provide an assembly of the character stated which includes a horizontal padder having only two horizontal squeeze rolls that contain a puddle of impregnating liquid in the upper facing nip therebetween and in which the fabric tube is received directly from the spreader tangential to the upper surface of the front squeeze roll.

Another object of this invention is to provide an assembly of the character stated in which dams are disposed at the ends of the squeeze rolls for containing the ends of the puddle of impregnating liquid and for establishing the depth thereof, the overflow from the dams being received by a catch pan for recirculation back to the puddle under liquid level control conditions in the pan to assure a constant and uniform supply to the puddle.

A further object of this invention is to provide an assembly of the character stated in which one of the squeeze rolls of the horizontal padder is laterally adjustable with respect to the other thereof.

A further object of this invention is to provide an assembly of the character stated in which the horizontal padder thereof includes a displaceable safety guard disposed above the nip of the squeeze rolls.

A further object of this invention is to provide an assembly of the character stated in which the safety guard includes an electrical interlock to render the entire assembly inoperative unless the safety guard is in its proper position over the nip of the squeeze rolls.

A further object of this invention is to provide a novel and improved method of padding and extracting a continuously advancing spread and flattened tube of circular knit fabric.

A further object of this invention is to provide an assembly of the character stated that is simple in design, rugged in construction and economical to manufacture.

With these and other objects, the nature of which will become apparent, the invention will be more fully understood by reference to the drawings, the accompanying detailed description and the appended claims.

Figure 1:
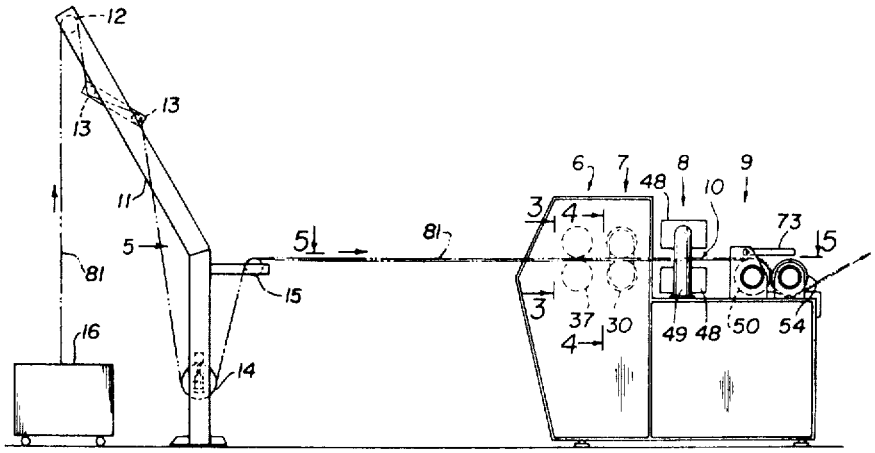
FIG. 1 is a somewhat schematic side elevation of a spreading and padding assembly constructed in accordance with this invention.

Referring to the drawings in detail, the invention, as illustrated, is embodied in a combined spreading, padding and extracting machine that includes a feed stand 5, a control roll station 6, a drive roll station 7, a steaming station 8, a horizontal padder and extractor 9 and a horizontal spreader 10.

The feed stand 5 is provided with the usual frame members 11,11 and includes an upper idler roll 12, a pair of spaced parallel offset tension rods 13,13 a skew-correcting roll 14 and an intermediate idler roll 15 disposed in parallel offset relation to the skew-correcting roll.

The flattened fabric tube is supplied to the feed stand from the usual truck 16 to the spreader 10 for the spreading, orienting, padding and extracting operations.

The spreader 10 is operably supported by the rolls at the control roll station 6 and by the tapered rolls at the drive roll station 7 and has a length extending from a position ahead of the control roll station to a rear terminus substantially tangential to the upper surface of the front roll of the padder and extractor 9.

Figure 5:
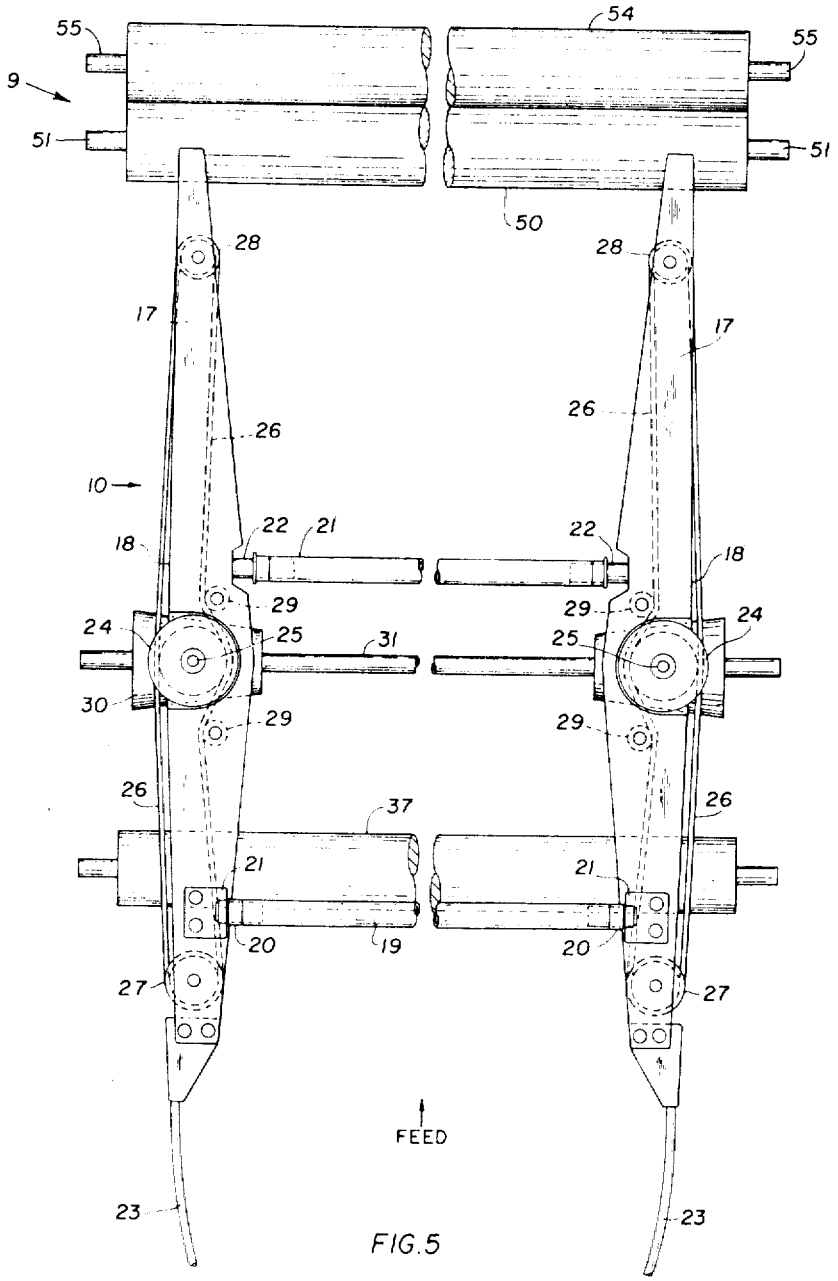
FIG. 5 is an enlarged top plan view of a preferred type of spreader for use in the assembly of this invention, the upper control roll and the upper pair of drive rolls not being shown in the interest of clarity of illustration.
Figure 7:
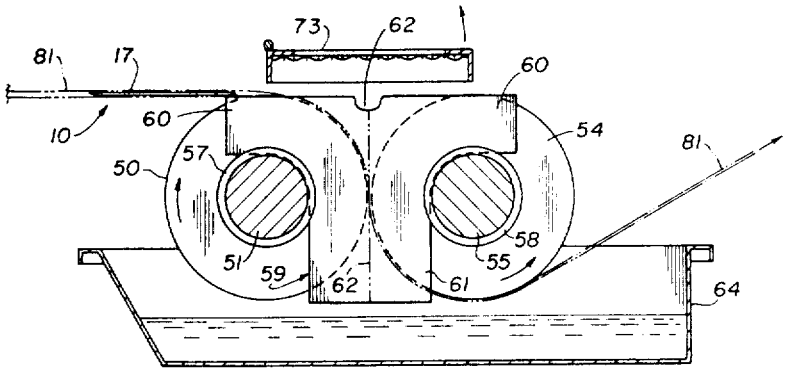
FIG. 7 is an enlarged detail longitudinal vertical section taken along line 7—7 of FIG. 6.
Figure 8:
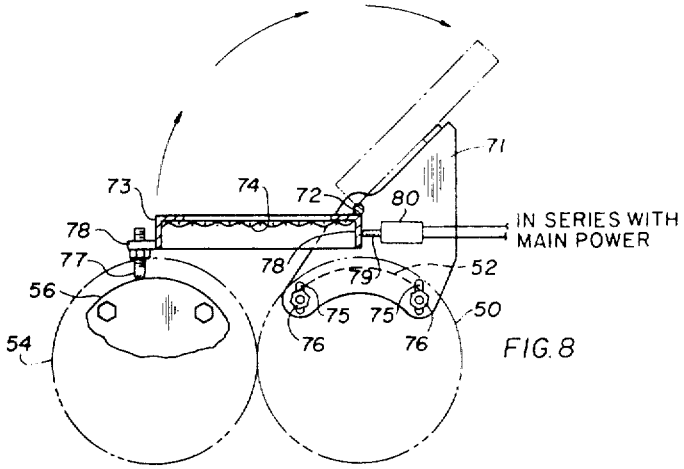
FIG. 8 is an enlarged detail side elevation of the upper portion of the padder and particularly shows the mounting of the nip safety guard and the micro-switch interlock.

The spreader 10 (see FIG. 5) includes a pair of spaced generally parallel horizontal frame members 17,17 having parallel outer edges 18,18.

The front ends of the frame members 17 are maintained in any predetermined spaced relation by a pair of upper and lower tubular rolls 19,19 (only one being shown) that are each freely mounted on a pair of opposed bearing-mounted rotatable spindles 20,20 carried by brackets 21,21 affixed to the upper and lower faces of the frame members. All that it is necessary to do to change the spacing between the front ends of the frame members 17 is to replace the rolls 19 by correspondingly longer or shorter rolls.

Similarly, the rear ends of the frame members 17 are maintained in the same predetermined spacing either by a single spacer tube 21 freely fitted on a pair of opposed studs 22,22 affixed to the frame members, or by an equivalent telescopically adjustable spacer tube.

A forwardly extending generally horizontal U-shaped heavy gauge wire guide or bow 23 may be affixed to the front ends of the frame members 17 whenever a preliminary lateral stretching of the fabric tube is necessary before the tube becomes fully engaged over the spreader.

The spreader also is constructed to geometrically orient or align the upper and lower face layers of the fabric tube through a selectively controllable circumferential drive or feed adjacent the front of the spreader, a tube face drive or feed in its intermediate portion and an inner edge drive along substantially all of its length.

For these purposes, the mid portion of each frame member 17 is provided with a pair of upper and lower frusto-conical idler wheels 24,24 mounted on a common vertical shaft or spindle 25 and having portions of their peripheries extending beyond the outer edge of the frame member. The opposed inner peripheral face portions of the idler wheels 24 are configured to define a pulley groove for operative engagement with an edge drive V-belt.

Each frame member 17 is provided with an edge drive V-belt 26 mounted between the upper and lower faces thereof and including a forward loop passing around a forward idler pulley 27 having a portion of its periphery extending beyond the outer edge of its associated frame member, a rear or tip loop passing around a rear idler pulley 28 having a portion of its periphery coplanar with the outer edge of its associated frame members so that the belt merges therewith at that location, and two intermediate flight portions that engage in opposite sides of the V-groove of the idler wheels 24 for driven association therewith. Supplementary idler rolls 29,29 are located to provide a partial driven wrap of the V-belt around an inner portion of the wheels 24 and either of the idlers 29 may be adjustably mounted to provide tension adjustment or slack take-up to the V-belt.

The face drive of the fabric tube is effected by opposed pairs of rubber covered feed rolls 30,30 mounted on a pair spaced parallel oppositely rotating splined shafts 31,31 operably connected to any suitable variable speed drive unit generally indicated 32. Each pair of feed rolls 30 is tapered to conform to the conical faces of the frustoconical wheels 24 for driving same and their associated V-belts 26 and for advancing face portions of the interposed fabric layers. Lateral spacing between the pairs of rolls 30 may be changed through the use of an oppositely threaded cross-screw 33 threadably engaged with roll bearing blocks 34,34 slidably mounted on the shafts 31. The cross-screw 33 may be driven in either direction of rotation by any suitable reversible motor drive generally indicated 35, thus enabling the spacing between the pairs of rolls 30 to be changed to conform to any change of spacing between the frame members 17 of the spreader.

The spreader 10 thus has its mid portion drivingly but freely supported by the tapered rolls 30 and can pivot about a traverse horizontal axis lying in a plane therebetween so that its cantilevered rear end can be brought into proper tangential relation with the front roll of the padder and extractor 9 by vertical adjustment of the front end of the spreader.

The circumferential feed of the fabric tube is effected at the front portion of the spreader by a combination of the V-belts 26, the spindles 20 and the tubular spacer rolls 19 through the medium of independently controlled and driven rolls at the control roll station 6, as now will be described.

Figure 2:
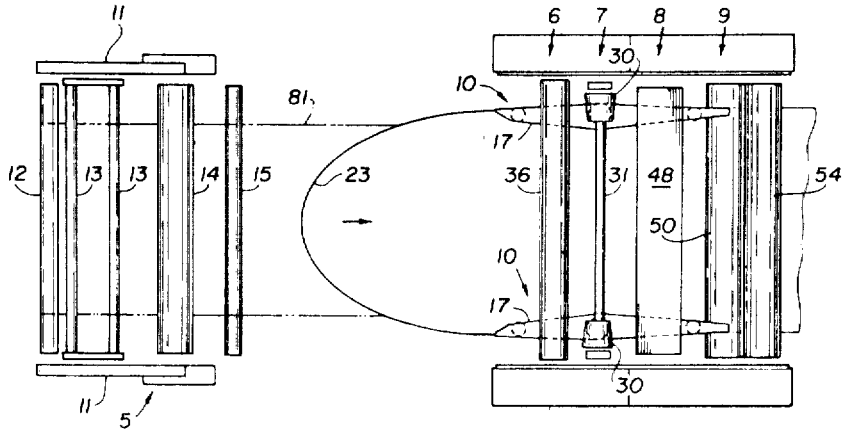
FIG. 2 is a top plan view thereof.
Figure 3:
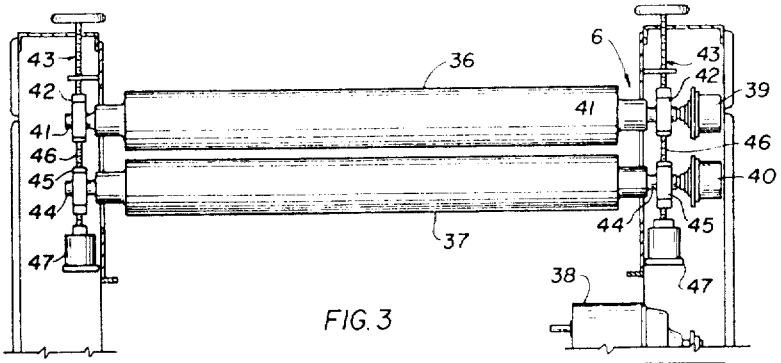
FIG. 3 is an enlarged vertical transverse section taken along line 3—3 of FIG. 1.
Figure 4:
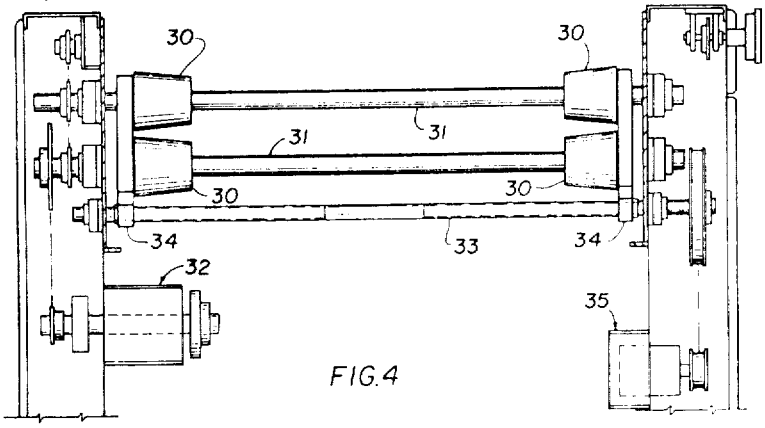
FIG. 4 is an enlarged vertical transverse section taken along line 4—4 of FIG. 1.
Figure 6:
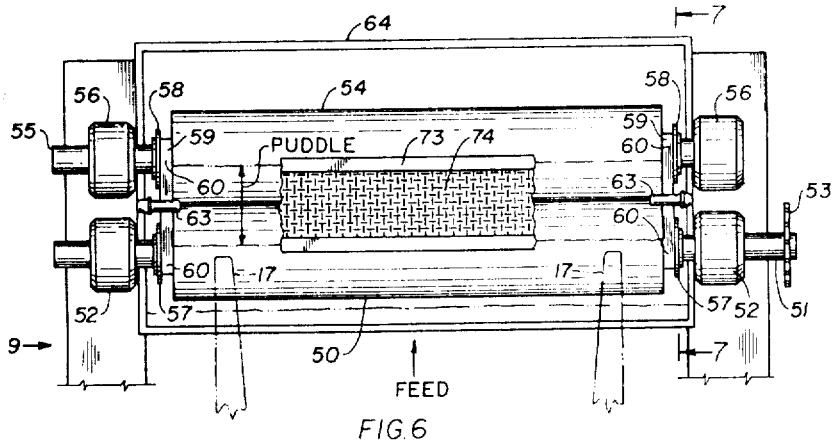
FIG. 6 is an enlarged top plan view of the padder station.

The control roll station 6 (See FIGS. 1, 2 and 3) includes an upper control roll 36 and a lower control roll 37 adapted to be respectively driven in opposite directions from a suitable type of variable speed drive unit generally indicated 38 through an upper adjustably air-loaded friction clutch 39 and a lower adjustably air-loaded friction clutch 40.

The upper control roll 36 is mounted on a shaft 41 journalled in slide-mounted bearing blocks 42,42 for vertical adjustment by associated handwheels and adjusting screws generally indicated 43,43. The lower control roll 37 similarly is mounted on a shaft 44 journalled in slide-mounted bearing blocks 45,45 for vertical adjustment relative to the bearing blocks 42 so that, once the upper control roll 36 has been properly positioned, the lower control roll 37 may be properly positioned with respect thereto. For this latter purpose, each of the lower bearing blocks 45 is provided with an upstanding spacing screw 46 threadably engaged therein and having its upper end disposed in abutting relation with the lower face of its associated upper bearing block 42 to establish and maintain proper clearance between the upper and lower control rolls 36 and 37. Air cylinders 47,47 disposed beneath the lower bearing blocks 45 are employed to lift and releasably maintain the lower control roll 37 in its adjustably set position relative to that of the upper control roll 36 once the position of that roll has been set by the handwheels 43 and the clearance between the two control rolls has been set by adjustment of the spacing screws 46.

The spacing between the upper and lower control rolls 36 and 37 is such that the front portion of the spreader 10 will fit with clearance therebetween and the front face portions of the control rolls will form transverse fabric feeding nips with the associated spindles 20 and the tubular spacer rolls 19 of the spreader and will also serve as rolling abutments to restrain the spreader against linear advance in the direction of fabric feed.

The steaming station 8 simply comprises a pair of oppositely disposed transverse hoods 48,48 above and below the spreader 10 and adapted to be supplied with moist steam as through valve-controlled pipes generally indicated 49.

As mentioned above, the rear end of the spreader 10 terminates in proximity to the front roll of the padder and extractor 9 in such a manner that the spread and oriented fabric tube immediately is received tangentially onto the upper surface of the front roll of that unit, thus entering into the padding and extracting operation without any loss of dimensional control and without disruption of its attained geometric orientation.

The padder and extractor 9 (See FIGS. 1, 2 and 6–9) is of a novel two roll horizontal construction that includes a rubber covered front roll 50 mounted on a shaft 51 journalled in end bearings 52,52 mounted on the side frames of the unit and is adapted to be driven at a selectively variable speed through a sprocket 53 by any suitable variable speed drive (not shown). A freely rotatable rubber covered rear roll 54, having the same length and diameter as the front roll 50, is disposed in nip-forming relation thereto and is mounted on a shaft 55 journalled in end bearings 56,56 adjustably carried by the main frame in such a manner that the nip pressure between the front and rear rolls may be readily and accurately adjusted or that the rolls may be separated for cleaning access or replacement when required.

The front shaft 51 is provided at each end with a flange 57 spaced outwardly from the respective end of the roll 50; and the rear shaft 55 of the roll 54 is provided with similar flanges 58, which flanges together define annular grooves at the ends of the rolls for the reception and retention of dams or weirs at the ends of a puddle of impregnating liquid in the upper nip of the rolls, as will be hereinafter more fully described.

A retaining dam or weir generally indicated 59 spans the upwardly directed nip between the rolls 50 and 54 and is of a generally T-shaped configuration that includes opposed upper arms 60,60 that are freely supported by the shafts 51 and 55 and a depending stem 61 that extends downwardly below the shafts. An upwardly open recess 62 in each dam or weir located with its bottom a predetermined height above the horizontal nip between the rolls 50 and 54, determines the height of the puddle of impregnating liquid to be retained and provides for a continuous overflow into a catch pan located beneath the rolls.

If it is assumed that the rubber coverings of the rolls 50 and 54 are trimmed to be of the same length and in relatively exact transverse alignment, the end dams 59 each can be of one piece construction, since there will be no built in misalignment to cause skew or binding. However, because most of the manufacturers who apply rubber coverings to rolls, such as the rolls 50 and 54 here, do not fabricate the coverings to such exact end dimensions or relative end alignments, it may be preferable to fabricate each end dam 59 into two symmetrically opposed parts by simply dividing each of same along a central dividing line so that each half section independently may adapt to its own end of its own associated roll. Thus, the interfaces between the two parts yet will prevent through-flow of the nip-retained liquid while still adapting to any inequalities between the ends of the rolls.

Figure 9:
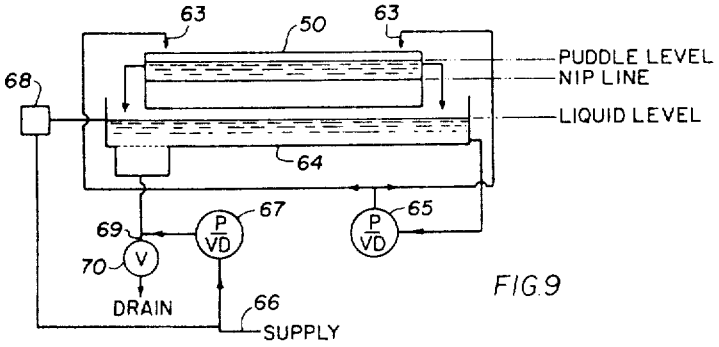
FIG. 9 is a schematic flow diagram of the liquid used in the padder.

For the purpose of padding, a puddle of impregnating liquid is supplied to the upwardly open nip between the rolls 50 and 54 through end pipes 63,63 and the overflow from the recesses 62 falls into a catch pan 64 located beneath the rolls 50 and 54 and extending somewhat therebeyond in all directions, from which it is recirculated back to the puddle by a recirculating pump 65 (see FIG. 9). The make-up liquid for the catch pan 64 is provided from a supply source 66 through a variable displacement pump 67 controlled by a liquid level control 68 operably associated with the catch pan 64. The catch pan also is provided with a drain pipe 69 provided with a shut-off valve 70.

Extraction of the excess free liquid that has been padded or impregnated into the fabric tube is effected by the squeezing action to the nip between the front and rear rolls and any bubble that may be formed prior to entry of the fabric tube in the nip is eliminated by free movement of the air through the upper layer of the tube fabric and forwardly toward the spreader as the fabric tube advances through its 90° of arc from its initial tangential contact with the upper face of the front roll 50 to the nip under fully controlled tension and geometric orientation.

This invention also provides means for eliminating any safety hazard that might otherwise be present as the result of having an upwardly directed open nip between the front and rear rolls of the padder and extractor.

For this purpose (See FIGS. 6–8), the casings of the bearings 52 of the front roll shaft 51 are each provided with an upstanding vertically adjustable bracket 71 having an inwardly directed pivot stud 72 affixed thereto in a position above the front roll 50 of the padder and extractor 9. A generally rectangular safety guard 73, having a heavy wire grid 74, is pivotally carried by the studs 72 and overlies at least the nip portion of the rolls 50 and 54 when the unit is in operation. Vertical adjustment of the studs 72 is effected by vertical adjustment of the brackets 71 through slots 75 and clamp bolts 76. Corresponding vertical adjustment of the rear end of the safety guard 73 is effected by adjusting screws 77 extending through lugs 78 into abutting contact with the casings of the rear bearings 56.

A further safety feature of the safety guard 73 is provided by including a frame element or lug 78 that extends downwardly from the location of one pivot stud 72 for engagement with the actuating pin or lever 79 of a microswitch 80 that is normally closed when the safety guard is in its operative position over the front and rear rolls of the padder. When the safety guard is lifted to gain access to the nip between the front and back rolls, the microswitch opens to effectively disconnect all power to at least the padder and extractor and preferably to the entire machine.

After the fabric tube has been padded and extracted it is delivered to a further processing unit which may dry, heat-cure and calender the thus treated fabric or may interpose the calendering between the drying and heat curing.

In operation, a flattened fabric tube 81 is led from the supply truck 16 over the upper idler roll 12 of the feed stand 5, then under the skew roll 14 and over the idler roll from which it is stretched over the guide bow 23 of the spreader 10. The tube 81 then is advanced over the spreader so that its upper layer passes over the upper tubular roll 19, but beneath the upper control roll 36, and its lower layer passes beneath the lower tubular roll 19 and over the lower control roll 37. The tube 81 then is further advanced so that its upper and lower layers are brought into face feeding contact between the tapered feed rolls 30 and their associated frusto-conical wheels 24, after which the tube is further advanced over the spreader past the steaming station 8 and into tangential engagement over the front roll 50 for initiation of the padding and extracting operation, after which it is delivered to further processing units for drying, curing and calendering.

In further reference to the operation, since the desired end result is the proper padding and extracting of the spread and geometrically oriented fabric tube, the speed of the padding and extracting unit 9 is controlling and the speed adjustments of the various rolls of the spreader are made relative thereto in order to attain proper geometric orientation of both layers of the tube before the tube enters into operational engagement. Thus, the squeeze rolls of the padder and extractor are driven at a selectively variable predetermined speed and, intially, the tapered drive rolls 30 and the control rolls 36 and 37 are driven at the same speed to establish a nominal or standard condition of operation. Then, since it is desirable to have the fabric tube enter the padder and extractor under a condition of controlled tension, the collective speeds of the tapered drive rolls and of the control rolls may be slightly reduced to create the desired tension. At this point, or any time thereafter, if visual observation indicates that only skew correction need be made to bring the layers of the fabric tube into proper transverse orientation, that correction can be made by raising or lowering one end of the skew roll 14, depending on the direction of skew, and after the skew correction has been made the skew roll is returned to its normal horizontal position. Further, if at any time it appears that one of the fabric layers is becoming retarded or advanced relative to the other layer, that condition can be corrected by an incremental change in the speed of the appropriate control roll 36 or 37 through its adjustable clutch 39 or 40, after which the affected control roll is returned to its original speed.

It is of course to be understood that variations in arrangements and proportions of parts may be made within the scope of the appended claims.

I claim:

1. In a method of padding and extracting a continuously advancing circular knit fabric tube having upper and lower layers by passage through a puddle of impregnating liquid contained within an upwardly open nip defined by a pair of opposed horizontally disposed squeeze rolls, the steps of spreading the advancing fabric tube to a predetermined width *by passage over a spreader and*, then immediately directing said spread fabric tube onto one of said squeeze rolls for advance in a generally downward direction through said puddle into said nip, the said upper layer of said fabric tube being free from contact with either of said squeeze rolls until its passage through said nip, and expelling any entrapped air in said fabric tube *by free movement of the air from the nip area forwardly towards the spreader and* through the said upper layer thereof during its advance over the said one of said squeeze rolls toward engagement with said nip as the result of directing said fabric tube into said puddle of impregnating liquid under controlled tension.

2. In a method of padding and extracting a continuously advancing circular knit fabric tube having upper and lower layers by passage through a puddle of impregnating liquid contained within an upwardly open nip defined by a pair of opposed horizontally disposed squeeze rolls, the steps of spreading the advancing fabric tube to a predetermined width *by passage over a spreader*, geometrically orienting the said upper and lower layers of said advancing fabric tube while said fabric tube is in its spread condition, then directing said spread and geometrically oriented fabric tube onto one of said squeeze rolls for advance in a generally downward direction through said puddle into said nip, and expelling any entrapped air in said fabric tube *by free movement of the air from the nip area forwardly towards the spreader and* through the said upper layer thereof as the result of directing said fabric tube into said puddle of impregnating liquid under controlled tension by selectively varying the speed of advance of said upper and lower layers relative to the speed of advance through said nip.

* * * * *